Sept. 2, 1924.  1,506,819
R. G. EDGELL
VARIABLE JET LIQUID SPRAYER
Filed June 20, 1923
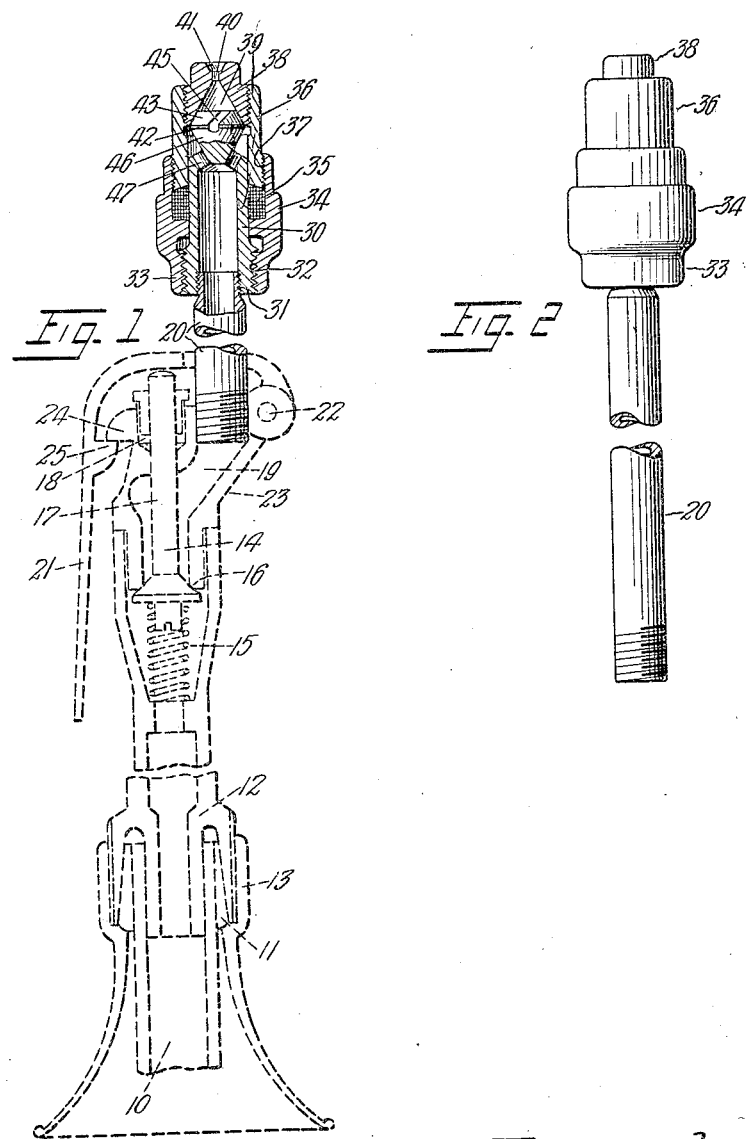
Inventor
R. G. Edgell
By Marks & Clerk
Attys.

Patented Sept. 2, 1924.

1,506,819

UNITED STATES PATENT OFFICE.

ROBERT GORDON EDGELL, OF BATHURST, NEW SOUTH WALES, AUSTRALIA.

VARIABLE-JET LIQUID SPRAYER.

Application filed June 20, 1923. Serial No. 646,672.

*To all whom it may concern:*

Be it known that I, ROBERT GORDON EDGELL, a subject of the King of Great Britain and Ireland, residing at Bradwardine, Bathurst, in the county of Bathurst and State of New South Wales, Australia, have invented certain new and useful Improvements in Variable-Jet Liquid Sprayers, of which the following is a specification.

This invention relates to nozzles for spraying mobile liquids, and it consists in the hereinafter described structural improvement in nozzles in which a nipple is carried in the top end of a tubular sleeve which is adjustable on a tubular stem, the head of which is located below the nipple and co-acts with the nipple to produce a spray of greater or less dispersion according to the sleeve adjustment.

In nozzles according to the present invention, the stem head is double conical and is truncated on the top end, one or more angularly disposed grooves being cut in its top conical face. The nipple is bored conical to make a close fit on the top cone of the stem head, and the nipple throat is a short cylindrical hole centrally disposed at the top of the conical bore. The sleeve which carries the nipple is adjustable on the stem tube which carries the double cone head by means of a screw thread, above which an adjustable packing gland movable along the stem tube is fitted to prevent leak back of liquid towards the thread.

In the accompanying drawings:—

Fig. 1 is a vertical section through the nozzle showing it mounted on a trigger type handpiece by means of which the operator is enabled to control a pressure supply of liquid. The nozzle may, however, be used on any service line through which liquid is forced under appropriate pressure to produce a jet or spray through the nipple; and Fig. 2 is a side elevational view of the nozzle.

In Fig. 1, 10 is a flexible hose connection from a source of water or other mobile liquid under pressure; 11 is a contracting taper collar by which the hose end 10 is fixed in the butt 12 of the trigger handpiece by screwing up the bell collar 13 to force said taper collar 11 upward and contract it upon the hose end. 14 is a valve normally held up by a spring 15 against a ring face 16. 17 is the valve stem. 18 is a stuffing box, and 19 a passage leading from the top side of the valve to the extension pipe 20, on the top end of which the nozzle is fitted. 21 is a lever fulcrumed at 22 on the valve casing 23, and 24 is a check which is engageable by the tooth 25 on the lever 21. When the lever 21 is grasped by the operator, the valve 14 is forced downward against the spring 15 and liquid may then flow upward from the hose 10 through the passage 19 and the extension pipe 20 to the nozzle.

The nozzle comprises a tubular stem 30 tapped at the bottom end 31 to set on the top end of the extension tube 20 and threaded exteriorly at the bottom end 32 to engage the tapped hole in the bottom end 33 of the sleeve 34. 35 is packing inserted in an annular packing space to form a gland around the upper part of the tubular stem 30. The nozzle head 36 is screwed into the tapped top end of the sleeve 34 above the packing 35, the thread 37 being made a tight fit in order that it will not ease back accidentally. 38 is a nipple. It is screwed into the top end of the head 36; interiorly it is bored conical as shown at 39, and at the apex of the cone a short cylindrical nipple hole 40 is drilled. 41 is a cup cavity surrounding the nipple hole 40, offering a protection for the nipple hole edges against deformation in the event of the nozzle head being struck or touched upon the ground.

At its upper end, the tubular stem 30 terminates in a head 42, the upper portion of which 43 is turned conically to the same angle as the conical boring 39 in the base of the nipple 38. One or more slots 45 are cut angularly in the conical top face 43 of the head 42, and said head is truncated so as to leave always a clear conical cavity above it within the nipple 38. The lower part 46 of the head 42 is also turned conically to produce a narrow neck at the junction of the head and tubular body portion of the stem and to provide clearance for two or more holes 47 drilled up through the shoulder portion of the stem.

The sleeve 34 and the sleeve head 36 form in effect one member which carries the nipple 38, and this member with the nipple is movable axially along the tubular stem 30 by rotating the sleeve 34 whereby the sleeve is forced along the tube as movement on the screw thread 33 progresses. In the full down position in which the adjustment is illustrated in Fig. 1, the top face 43 of the double cone head of the tubular stem is in close contact with the conical bore of the nipple 38. When the sleeve 34 is rotated to move it outward along the tubular stem 30, an annular clearance is offered around the conical top of the stem head 43, the cross sectional area of this conical clearance space being dependent upon the adjustment of the nipple in relation to the stem head, which adjustment is effected by rotating the sleeve 34.

In the full down setting shown in Fig. 1, liquid which is forced up through the tubular stem 30 passes thence through the shoulder holes 47 and the annular clearance space about them and thence through the angularly directed grooves 45 to the conical space 39, and thence out through the nipple hole 40. The liquid which passes up in this adjustment is in a rapidly whirling condition in the conical chamber 39, and when it emerges through the cylindrical nipple hole 40, the liquid is rapidly atomized and projected as a mist spray. When the sleeve 34 is moved upwardly, some of the liquid passes through the clearance space then available between the stem head 43 and the conical walls of the nipple base. The liquid which thus passes up is not in a whirling condition but, on entering the conical chamber 39, it receives a whirling impulse from the jet or jets of liquid which pass into that conical space through the slots 45. A modified spray is thus produced, the angle of dispersion and the degree of atomization being dependent upon the amount of clearance offered between the stem head 43 and the walls of the nipple cone. By rotating the sleeve 34 the operator is thus offered great facility for adjustment of the nozzle so that he may, at will, cause to be thrown either a pin jet with little dispersion or a jet more or less dispersed in any measure up to the extreme position in which a full mist spray is produced.

What I claim as my invention and desire to secure by Letters Patent is:—

A spray nozzle comprising a tubular stem, the outer end of which is formed with an inwardly extending shoulder while the lower portion is threaded interiorly for attachment and also threaded exteriorly, a double conical head integral with the shoulder and truncated at the top, water passages provided through the shoulder of the said stem below the head, a sleeve threaded at opposite ends for adjustable engagement with the exterior thread of the stem and provided with a recess, a packing gland arranged in said recess and movable along the stem on adjustment of the sleeve, a sleeve head adjustably engaged with the outer end of the sleeve and coacting with the gland, a conical based nipple carried on the top of said sleeve, the cone of said nipple corresponding with the cone of the top of said head, and the truncated cone head of the stem being provided with an angularly disposed slot, substantially as and for the purposes set forth.

In testimony whereof I affix my signature.

ROBERT GORDON EDGELL.